United States Patent
Kikuchi et al.

(10) Patent No.: US 9,023,454 B2
(45) Date of Patent: May 5, 2015

(54) FORMED ZEOLITE HONEYCOMB ARTICLE AND FIRED ZEOLITE HONEYCOMB ARTICLE

(75) Inventors: Yoshio Kikuchi, Nagoya (JP); Haruo Otsuka, Ichinomiya (JP)

(73) Assignee: NGK Insulators, Ltd., Nagoya (JP)

( * ) Notice: Subject to any disclaimer, the term of this patent is extended or adjusted under 35 U.S.C. 154(b) by 986 days.

(21) Appl. No.: 13/052,390

(22) Filed: Mar. 21, 2011

(65) Prior Publication Data

US 2011/0236625 A1 Sep. 29, 2011

(30) Foreign Application Priority Data

Mar. 25, 2010 (JP) ................................. 2010-070106

(51) Int. Cl.
*C04B 35/16* (2006.01)
*C04B 35/80* (2006.01)
(Continued)

(52) U.S. Cl.
CPC .............. *B01J 35/04* (2013.01); *B01D 53/9413* (2013.01); *B01D 2255/1023* (2013.01); *B01D 2255/104* (2013.01); *B01D 2255/2065* (2013.01); *B01D 2255/20723* (2013.01); *B01D 2255/2073* (2013.01); *B01D 2255/20738* (2013.01); *B01D 2255/20746* (2013.01); *B01D 2255/20753* (2013.01); *B01D 2255/20792* (2013.01); *B01D 2255/502* (2013.01); *B01D 2255/504* (2013.01);
(Continued)

(58) Field of Classification Search
CPC ................... C04B 2235/9615; B01D 46/2429; B28B 2003/203; F01N 2330/06; F01N 3/0222

USPC ............................ 428/116–118; 55/522–524; 422/169–172, 177–181; 502/60–68, 502/87, 439; 423/700, 239.2
See application file for complete search history.

(56) References Cited

U.S. PATENT DOCUMENTS 6,506,336 B1 * 1/2003 Beall et al. ..................... 264/630
2007/0259770 A1 11/2007 Hofmann et al.
(Continued)

FOREIGN PATENT DOCUMENTS

EP 2 123 614 A2 11/2009
EP 2 130 591 A2 12/2009
(Continued)

OTHER PUBLICATIONS

U.S. Appl. No. 13/050,381, filed Mar. 17, 2011, Yoshio Kikuchi.
(Continued)

*Primary Examiner* — David Sample
*Assistant Examiner* — Nicholas W Jordan
(74) *Attorney, Agent, or Firm* — Burr & Brown, PLLC

(57) ABSTRACT

A formed zeolite honeycomb article comprises a formed article obtained by extruding a zeolite raw material containing zeolite particles, an inorganic binding material and a filler constituted of plate-like particles in a honeycomb shape including partition walls disposed to form a plurality of cells, a drying shrinkage of the partition walls in a thickness direction thereof is larger than a drying shrinkage of the partition walls in a cell extending direction thereof and a drying shrinkage of the partition walls in a diametric direction perpendicular to the cell extending direction thereof, and the drying shrinkage of the partition walls in the thickness direction thereof is 1.2 or more times the drying shrinkage of the partition walls in the diametric direction perpendicular to the cell extending direction thereof in the formed zeolite honeycomb article.

22 Claims, 3 Drawing Sheets

(51) Int. Cl.
    *B01D 46/24*     (2006.01)
    *C01B 39/02*     (2006.01)
    *B01J 35/04*     (2006.01)
    *B01D 53/94*     (2006.01)
    *B01J 29/06*     (2006.01)
    *C04B 35/18*     (2006.01)
    *C04B 35/626*     (2006.01)
    *C04B 35/63*     (2006.01)
    *C04B 38/00*     (2006.01)
    *C04B 111/00*     (2006.01)
    *C04B 111/34*     (2006.01)

(52) U.S. Cl.
    CPC .............. B01J 29/06 (2013.01); C04B 35/18 (2013.01); C04B 35/62635 (2013.01); C04B 35/6303 (2013.01); C04B 35/6316 (2013.01); C04B 38/0006 (2013.01); *C04B 2111/0081* (2013.01); *C04B 2111/343* (2013.01); *C04B 2235/3201* (2013.01); *C04B 2235/3217* (2013.01); *C04B 2235/3218* (2013.01); *C04B 2235/3229* (2013.01); *C04B 2235/3232* (2013.01); *C04B 2235/3244* (2013.01); *C04B 2235/3281* (2013.01); *C04B 2235/3427* (2013.01); *C04B 2235/3445* (2013.01); *C04B 2235/3463* (2013.01); *C04B 2235/349* (2013.01); *C04B 2235/36* (2013.01); *C04B 2235/386* (2013.01); *C04B 2235/425* (2013.01); *C04B 2235/444* (2013.01); *C04B 2235/483* (2013.01); *C04B 2235/5292* (2013.01); *C04B 2235/5296* (2013.01); *C04B 2235/5409* (2013.01); *C04B 2235/5427* (2013.01); *C04B 2235/5445* (2013.01); *C04B 2235/606* (2013.01); *C04B 2235/61* (2013.01)

(56) References Cited

U.S. PATENT DOCUMENTS

| | | |
|---|---|---|
| 2007/0269352 A1 | 11/2007 | Miyairi et al. |
| 2009/0291253 A1 | 11/2009 | Ohno et al. |
| 2009/0291825 A1* | 11/2009 | Ohno et al. .................... 502/64 |
| 2011/0118106 A1* | 5/2011 | Sato et al. ...................... 502/62 |

FOREIGN PATENT DOCUMENTS

| | | |
|---|---|---|
| JP | 3272446 B2 | 4/2002 |
| JP | 2007-296514 A1 | 11/2007 |
| JP | 2007-296521 A1 | 11/2007 |
| JP | 2008-169104 A1 | 7/2008 |
| JP | 2009/000657 A1 | 1/2009 |
| WO | 2009/141878 A1 | 11/2009 |

OTHER PUBLICATIONS

U.S. Appl. No. 13/052,352, filed Mar. 21, 2011, Yoshio Kikuchi.
U.S. Appl. No. 13/069,753, filed Mar. 23, 2011, Yoshio Kikuchi.
U.S. Appl. No. 13/050,302, filed Mar. 17, 2011, Yoshio Kikuchi.

\* cited by examiner

FORMED ZEOLITE HONEYCOMB ARTICLE AND FIRED ZEOLITE HONEYCOMB ARTICLE

BACKGROUND OF THE INVENTION

1. Field of the Invention

The present invention relates to a formed zeolite honeycomb article and a fired zeolite honeycomb article. More particularly, it relates to a formed zeolite honeycomb article in which generation of cracks due to a drying shrinkage is effectively suppressed during drying, and a fired zeolite honeycomb article having an excellent mechanical strength.

2. Description of the Related Art

It is known that zeolite is a type of silicate having a mesh crystal structure provided with fine pores having a uniform diameter, there are present various chemical compositions represented by the general formula: $W_m Z_n O_{2n} \cdot sH_2O$ (W: sodium, potassium, calcium or the like, Z: silicon, aluminum or the like, and s takes various values), and there are present many kinds (types) of crystal structures having different pore shapes. Zeolite has an inherent adsorption ability, catalyst performance, solid acid characteristics, ion exchange ability and the like based on the respective chemical compositions or crystal structures, and is utilized in various use applications such as an adsorbing material, a catalyst, a catalyst carrier, a gas separation membrane and an ion exchanger (e.g., see Patent Documents 1 to 3).

For example, MFI-type zeolite (also referred to as "ZSM-5 type zeolite") is provided with pores each having a size of about 0.5 nm by oxygen ten-membered rings among crystals, and is utilized in a use application such as an adsorbing material for adsorbing nitrogen oxides ($NO_x$), hydrocarbons (HC) or the like in a car exhaust gas, or a gas separation membrane for selectively separating only p-xylene from a xylene isomer. Moreover, Deca-Dodecasil 3R (DDR) type zeolite is zeolite provided with pores of about 0.44×0.36 nm by oxygen eight-membered rings among crystals, and is utilized in a use application such as a gas separation membrane for selectively separating/removing only carbon dioxide from a natural gas or a biogas to improve purity of methane which is useful as a fuel.

Moreover, for the purpose of removing $NO_x$ or the like contained in an exhaust gas discharged from an engine for a car, an engine for a construction machine, an industrial stationary engine, a burning apparatus or the like or adsorbing hydrocarbons or the like contained in the exhaust gas, as a ceramic carrier (a honeycomb structure) made of cordierite or the like and having a honeycomb shape, there is used a catalyst article onto which zeolite subjected to an ion exchange treatment is loaded.

When zeolite is loaded onto the above ceramic carrier made of cordierite or the like, cordierite or the like does not exert a function of removing $NO_R$, a function of adsorbing hydrocarbons or the like. Therefore, when cordierite or the like is present, a pressure loss during passing of the exhaust gas increases.

To solve this problem, there is suggested a method of forming and firing a forming raw material containing zeolite subjected to an ion exchange treatment between cations of zeolite and metal ions, to form a honeycomb structure itself (e.g., see Patent Documents 4 to 6).

[Patent Document 1] JP-A-2007-296521
[Patent Document 2] Japanese Patent No. 3272446
[Patent Document 3] JP-A-2009-000657
[Patent Document 4] JP-A-2008-169104
[Patent Document 5] JP-A-2007-296514
[Patent Document 6] WO2009/141878A1

SUMMARY OF THE INVENTION

However, in such a formed article obtained by extruding a forming raw material containing zeolite into a honeycomb shape including partition walls disposed to form a plurality of cells which become through channels of a fluid and extend from one end face of the article to the other end face thereof (hereinafter referred to as the formed zeolite honeycomb article), a problem occurs that a drying shrinkage during drying is large and cracks are easily generated. In particular, the article has a large drying shrinkage amount in a cell extending direction of the partition walls and in a diametric direction of the end faces of the partition walls in the honeycomb shape, and the cracks are remarkably generated during the drying.

Moreover, when the drying shrinkage is decreased to suppress the generation of the cracks, the forming raw material is not compressed in a thickness direction of the partition walls, which causes a problem that the porosity of a fired zeolite honeycomb article obtained through firing becomes large. Thus, a mechanical strength of this fired zeolite honeycomb article lowers.

That is, as described above, the drying shrinkage in the cell extending direction and the end face diametric direction is large, thereby generating the cracks during the drying, whereas the forming raw material is not compressed, thereby lowering the mechanical strength of the partition walls. These problems have an antinomy relation, and it has been remarkably difficult to solve both the problems.

The present invention has been developed in view of the above problem, and an object thereof is to provide a formed zeolite honeycomb article in which generation of cracks due to a drying shrinkage during drying is effectively suppressed, and a fired zeolite honeycomb article having an excellent mechanical strength.

The present inventor has intensely performed investigation to solve the above problem of a conventional technology, and has considered that a zeolite raw material for extrusion forming of a formed zeolite honeycomb article contains a filler constituted of plate-like particles having a thin-piece-like shape where a length in a thickness direction is small with respect to a length of a long diameter, and a drying shrinkage in a specific direction of the formed zeolite honeycomb article is suppressed to solve the above problem, thereby completing the present invention. Specifically, according to the present invention, the formed zeolite honeycomb article and the fired zeolite honeycomb article are provided as follows.

[1] A formed zeolite honeycomb article comprising a formed article obtained by extruding a zeolite raw material containing zeolite particles, an inorganic binding material which binds the zeolite particles to one another and a filler constituted of plate-like particles having a thin-piece-like shape where a length in a thickness direction is small as compared with a length of a long diameter, in a honeycomb shape including partition walls disposed to form a plurality of cells which become through channels of a fluid and extend from one end face to the other end face, wherein the partition walls have a constitution where a drying shrinkage of the partition walls in a thickness direction is larger than a drying shrinkage of the partition walls in a cell extending direction and a drying shrinkage of the partition walls in a diametric direction of sections of the partition walls which is perpendicular to the cell extending direction in the honeycomb shape, and the drying shrinkage of the partition walls in the thickness direction is 1.2 or more times the drying shrinkage of the partition walls in the diametric direction of the sections of the partition walls which is perpendicular to the cell extending direction in the honeycomb shape.

[2] The formed zeolite honeycomb article according to [1], wherein in the plate-like particles constituting the filler, a value (the long diameter/a thickness) of a ratio of the length of the long diameter with respect to the length thereof in the thickness direction is 10 or more, the average particle diameter of the plate-like particles is 20 μm or more and twice or more the average, particle diameter of the zeolite particles, the plate-like particles are contained in an amount corresponding to 2.5 to 15 vol % with respect to 100 vol % of the total of the zeolite particles, the inorganic binding material and the plate-like particles in terms of a solid content, and the inorganic binding material is contained in an amount corresponding to 10 to 50 vol % with respect to 100 vol % of a fired article obtained by firing the formed zeolite honeycomb article.

[3] The formed zeolite honeycomb article according to [1] or [2], wherein the plate-like particles are particles constituted of at least one type of a material selected from the group consisting of talc, mica, boron nitride, boehmite, graphite, and glass flakes.

[4] The formed zeolite honeycomb article according to any of [1] to [3], wherein the average particle diameter of the zeolite particles is from 0.1 to 40 µm.

[5] The formed zeolite honeycomb article according to any of [1] to [4], wherein zeolite particles of at least a part of the zeolite particles are particles made of at least one type of zeolite selected from the group consisting of ZSM-5 type zeolite, β-type zeolite, Y-type zeolite, mordenite type zeolite and ferrierite type zeolite.

[6] The formed zeolite honeycomb article according to any of [1] to [5], wherein zeolite particles of at least a part of the zeolite particles are particles made of zeolite subjected to ion exchange between cations of zeolite and ions of at least one type of metal selected from the group consisting of copper, iron, nickel, zinc, manganese, cobalt, silver, palladium, indium, cerium, gallium, titanium, and vanadium.

[7] The formed zeolite honeycomb article according to any of [1] to [6], wherein the inorganic binding material includes at least one type selected from the group consisting of alumina sol, silica sol, titania sol, zirconia sol, ceria sol, boehmite, montmorillonite, hydrotalcite, basic aluminum chloride, hydraulic alumina, silicon resin, and water glass.

[8] A fired zeolite honeycomb article which is obtained by firing the formed zeolite honeycomb article according to any of [1] to [7].

[9] A manufacturing method of a formed zeolite honeycomb article, comprising: a step of mixing zeolite particles, an inorganic binding material which binds the zeolite particles to one another, a filler constituted of plate-like particles having a thin-piece-like shape where a length in a thickness direction is small as compared with a length of a long diameter thereof, and an organic binder to prepare a zeolite raw material; and a step of extruding the obtained zeolite raw material in a honeycomb shape to obtain a formed zeolite article, wherein as the plate-like particles constituting the filler, there are used particles in which a value (the long diameter/a thickness) of a ratio of the length of the long diameter with respect to the length thereof in the thickness direction is 10 or more, the average particle diameter of the plate-like, particles is 20 µm or more and is twice or more the average particle diameter of the zeolite particles, and in the zeolite raw material, the plate-like particles are contained in an amount corresponding to 2.5 to 15 vol % with respect to 100 vol % of the total of the zeolite particles, the inorganic binding material and the plate-like particles in terms of a solid content, and the inorganic binding material is contained in an amount corresponding to 10 to 50 vol % with respect to 100 vol % of a fired article obtained by firing the formed zeolite honeycomb article.

In a formed zeolite honeycomb article of the present invention, a zeolite raw material for extrusion forming of the formed zeolite honeycomb article contains a filler constituted of plate-like particles having a thin-piece-like shape where a length in a thickness direction is small with respect to a length of a long diameter, thereby obtaining a constitution in which a drying shrinkage of partition walls in the thickness direction thereof is larger than the drying shrinkage of the partition walls in a cell extending direction thereof and a drying shrinkage of the partition walls in the diametric direction of the sections of the partition walls which is perpendicular to the cell extending direction thereof in the honeycomb shape. Furthermore, the drying shrinkage of the partition walls in the thickness direction thereof is 1.2 or more times the drying shrinkage of the partition walls in the diametric direction of the sections of the partition walls which is perpendicular to the cell extending direction thereof in the honeycomb shape.

As described above, in the formed zeolite honeycomb article of the present invention, the drying shrinkage amount of the partition walls in the cell extending direction and in the diametric direction of the sections of the partition walls which is perpendicular to the cell extending direction of the partition walls in the honeycomb shape which are relatively large during the drying are small. Therefore, during the drying, the generation of cracks due to the drying shrinkage is effectively suppressed. On the other hand, the drying shrinkage of the partition walls in the thickness direction is large as compared with that in the above directions. The shrinkage during the drying lowers the porosity of the partition walls, and the mechanical strength of the fired article obtained by firing the formed article can be improved.

Moreover, the fired zeolite honeycomb article of the present invention is the fired article obtained by firing the above formed zeolite honeycomb article of the present invention. There is suppressed generation of the cracks due to the drying shrinkage in the cell extending direction of the partition walls and in the diametric direction of the sections of the partition walls which is perpendicular to the cell extending direction of the partition walls in the honeycomb shape, and the porosity of the partition walls in the thickness direction thereof lowers owing to an adequate drying shrinkage, whereby the article has an excellent mechanical strength.

DETAILED DESCRIPTION OF THE INVENTION

Next, an embodiment for carrying out the present invention will be described in detail with reference to the drawings, but it should be understood that the present invention is not limited to the following embodiment, and design modification, improvement and the like are appropriately added to the embodiment based on knowledge of a person with ordinary skill without departing from the scope of the present invention.

Figure 1:
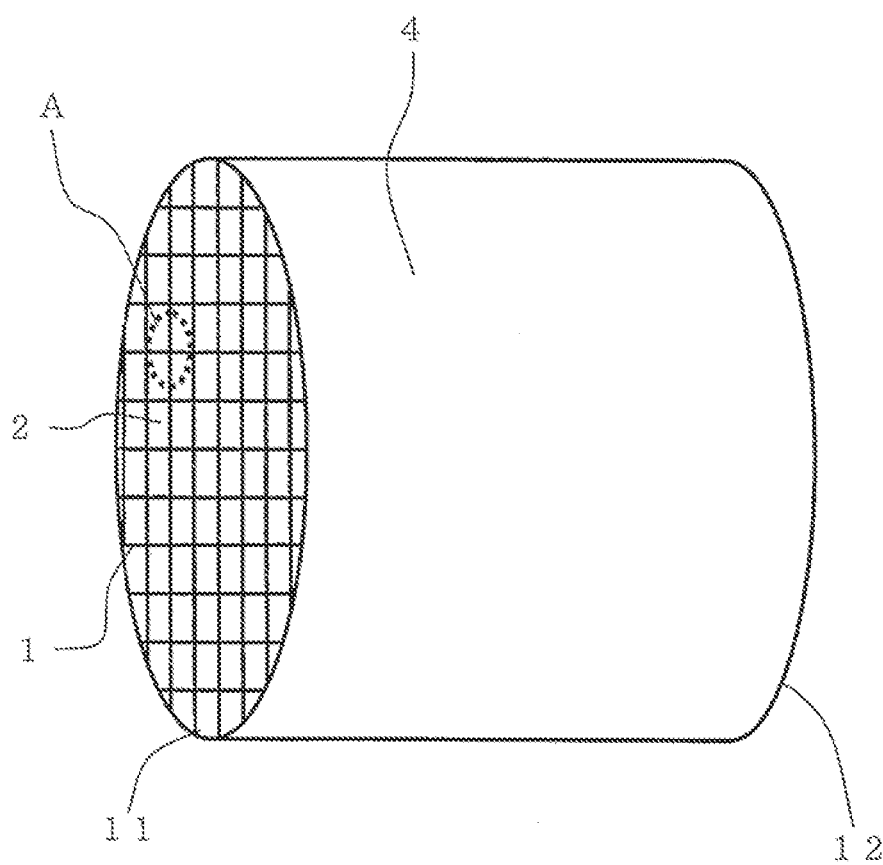
FIG. 1 is a perspective view schematically showing one embodiment of a formed zeolite honeycomb article of the present invention.

(1) Formed Zeolite Honeycomb Article:

As shown in FIG. 1, an embodiment of a formed zeolite honeycomb article of the present invention is a formed article (a formed zeolite honeycomb article 100) obtained by extruding a zeolite raw material containing a plurality of zeolite particles, an inorganic binding material which binds the zeolite particles to one another and a filler constituted of plate-like particles having a thin-piece-like shape where a length in a thickness direction is small as compared with a length of a long diameter thereof, in a honeycomb shape including partition walls 1 disposed to form a plurality of cells 2 which become through channels of a fluid and extend from one end face 11 to the other end face 12.

Figure 2:
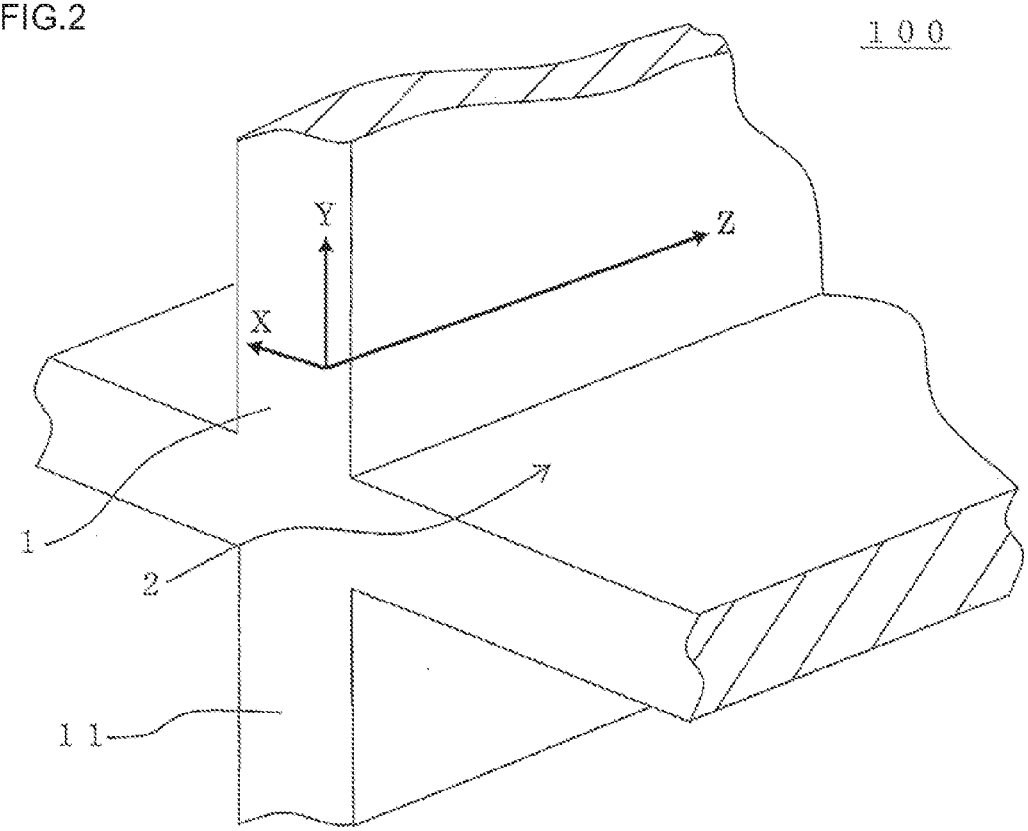
FIG. 2 is an enlarged view in which a portion shown by area A of FIG. 1A is partially enlarged.

Moreover, as shown in FIG. 2, the partition walls 1 of the formed zeolite honeycomb article 100 of the present embodiment have a constitution in which a drying shrinkage of the partition wall 1 in a thickness direction X is larger than a drying shrinkage of the partition walls 1 in an extending direction Z of the cells 2 and a drying shrinkage of the partition walls 1 in a diametric direction Y of the sections of the partition walls which is perpendicular to the cell extending direction in the honeycomb shape (hereinafter referred to simply as "the sections in the honeycomb shape" sometimes), and the drying shrinkage of the partition walls 1 in the thickness direction X is 1.2 or more times the drying shrinkage of the partition walls 1 in the diametric direction Y of the sections in the honeycomb shape. Here, FIG. 1 is a perspective view schematically showing one embodiment of the formed zeolite honeycomb article of the present invention; and FIG. 2 is an enlarged view in which a part shown by an area A of FIG. 1 is partially enlarged.

In this way, in the formed zeolite honeycomb article 100 of the present embodiment, the zeolite raw material for extrusion forming of the formed zeolite honeycomb article contains a filler constituted of plate-like particles having a thin-piece-like shape where a length in a thickness direction is small as compared with a length of a long diameter. During the extrusion forming, the plate-like particles having the thin-piece-like shape are extruded together with the zeolite particles and the inorganic binding material in a state where the surfaces of the plate-like particles (specifically, the surfaces including long diameters) are arranged in parallel with an extruding direction (i.e., the cell extending direction), to obtain the formed article (specifically, the partition walls). Therefore, in the formed zeolite honeycomb article 100 of the present embodiment, it is possible to suppress the drying shrinkage of the formed zeolite honeycomb article in a specific direction. That is, anisotropic control of the drying shrinkage can be performed.

More specifically, the plate-like particles having the thin-piece-like shape are particles made of an inorganic material or the like, and hence the plate-like particles themselves do not dry-shrink. Even if the particles dry-shrink, the drying shrinkage is remarkably small. Moreover, since these plate-like particles have a thin-piece-like shape where a length in a thickness direction is small as compared with a length of a long diameter thereof, during the extrusion forming of the zeolite raw material, the plate-like particles are oriented so that the surfaces of the plate-like particles are arranged in parallel with the extruding direction. In other words, long sides of the plate-like particles are arranged along the extending direction Z of the cells 2 of the partition walls 1 (hereinafter, this direction will be referred to simply as "the cell extending direction Z" sometimes) and the diametric direction Y of the sections of the partition walls 1 in the honeycomb shape (hereinafter referred to simply as "the diametric direction Y" sometimes).

Therefore, the ratio of the plate-like particles per unit length in the cell extending direction Z and the diametric direction Y increases, and the drying shrinkages in the cell extending direction Z and the diametric direction Y become small. On the other hand, in the thickness direction X of the partition walls 1 (hereinafter, this direction will be referred to simply as "the thickness direction X" sometimes), thin portions of the plate-like particles are arranged. Therefore, the ratio of the plate-like particles per unit length lowers, and the drying shrinkage becomes relatively large. That is, the drying shrinkage becomes close to that of the zeolite raw material excluding the plate-like particles.

As to the partition walls, lattice-like walls disposed to form the cells extend in the cell extending direction Z and the diametric direction Y. As compared with the length of the partition walls 1 in the thickness direction X, lengths are remarkably large: the length of the partition walls 1 in the extending directions of the cells 2 (i.e., the length of each partition wall which continues in the extending direction of the cells 2); and the length of the partition walls 1 in the diametric direction Y of the section in the honeycomb shape (i.e., the length of the partition wall which continues from one portion of the formed zeolite honeycomb article on an outer peripheral side to the other portion thereof, e.g., the length corresponding to the diameter of the above section). A conventional formed zeolite honeycomb article has a problem that due to the drying shrinkage in the cell extending direction Z and the diametric direction Y, cracks are remarkably generated.

In the formed zeolite honeycomb article of the present embodiment, with respect to "the cell extending direction Z and the diametric direction Y" where the cracks are remarkably generated as described above, the drying shrinkage is suppressed (anisotropically controlled), whereby the generation of the cracks can satisfactorily be prevented. On the other hand, with respect to "the thickness direction X of the partition walls" where the cracks due to the drying shrinkage are not easily generated, the suppression of the drying shrinkage is less performed, and the porosity of the partition walls is lowered, whereby it is possible to improve the mechanical strength of the fired article obtained through the firing.

It is to be noted that in the present embodiment, "the cell extending direction Z of the partition walls", "the thickness direction X of the partition walls" and "the diametric direction Y of the sections of the partition walls in the honeycomb shape" are orthogonal to one another as shown in FIG. 2. That is, in FIG. 2, in the one end face 11 of the formed zeolite honeycomb article 100, the partition walls which extend in an upward-downward direction in a figure sheet surface have a right-left direction in the sheet surface as "the thickness direction X of the partition walls", have a direction where the partition walls extend in the upward-downward direction as "the diametric direction Y of the sections of the partition walls in the honeycomb shape", and have a direction which is orthogonal to the one end face 11 (a direction where the zeolite raw material is extruded) as "the cell extending direction Z of the partition walls".

It is to be noted that when "the thickness direction X of the partition walls" and "the diametric direction Y of the sections of the partition walls in the honeycomb shape" are defined, the thickness direction of the partition walls to partition the adjacent cells is preferably defined as "the thickness direction X of the partition walls". A direction which is orthogonal to this "thickness direction X of the partition walls" in the sections of the partition walls which are perpendicular to the cell extending direction in the honeycomb shape is preferably defined as "the diametric direction Y of the sections of the partition walls in the honeycomb shape". For example, in FIG. 2, as to the partition walls which extend in the right-left direction of the sheet surface (i.e., the partition walls which intersect with the above "partition walls extending in the upward-downward direction" at 90°), the upward-downward direction in the sheet surface is "the thickness direction X of the partition walls", and the right-left direction of the sheet surface is "the diametric direction Y of the sections of the partition walls in the honeycomb shape". In consequence, even when the sectional shape of the cells is a polygonal shape other than a quadrangular shape, the respective directions can clearly be defined.

Moreover, in the present invention, "the drying shrinkage" is a value of a ratio of a shrinkage dimension (length) due to drying with respect to the dimension (the length) of the dried formed zeolite honeycomb article. Specifically, the dimension of the formed zeolite honeycomb article before dried is "a formed article dimension A", the dimension of the formed zeolite honeycomb article after dried is "a dried article dimension B", and the drying shrinkage can be represented by equation (1) as follows.

$$\text{Drying shrinkage} = \{(\text{the formed article dimension } A - \text{the dried article dimension } B)/\text{the formed article dimension } A\} \times 100 \quad (1)$$

It is to be noted that, for example, "the drying shrinkage of the partition walls in the thickness direction" is obtained by measuring the thicknesses of the partition walls of the formed zeolite honeycomb article with an optical microscope or the like, drying the formed zeolite honeycomb article, and then measuring the thicknesses of the partition walls (the thicknesses of the partition walls in the dried article) again, whereby the drying shrinkage can be calculated by the above (1).

Moreover, "the drying shrinkage of the partition walls in the cell extending direction" is obtained by measuring the length of the formed zeolite honeycomb article in the cell extending direction (i.e., the extruding direction) with a caliper or the like, drying the formed zeolite honeycomb article, and then measuring the length of the dried article in the cell extending direction, whereby the drying shrinkage can be calculated by the above (1).

Furthermore, "the drying shrinkage of the partition walls in the diametric direction of the sections in the honeycomb shape" is obtained by measuring the length of the outer diameter of the formed zeolite honeycomb article with the caliper or the like, drying the formed zeolite honeycomb article, and then measuring the length of the outer diameter of the dried article, whereby the drying shrinkage can be calculated by the above (1).

Moreover, "the plate-like particles" mean thin-piece-like particles where a length in a thickness direction is small as compared with a length of a long diameter of the particles. It is to be noted that "the thin-piece-like shape" means a shape having two or more comparatively flat surfaces. Two of the flat surfaces are substantially parallel to each other and have a two-dimensional spread, and a distance between substantially the parallel surfaces (the length in the thickness direction) is small as compared with the length of the long diameter of each surface. That is, the plate-like particles having the thin-piece-like shape do not include rod-like particles having a large length in a uniaxial direction (in other words, the rod-like particles which do not have any flat surface).

Moreover, "the length of the long diameter" of the plate-like particles means the length of a portion having the longest diameter in the plate-like particles. On the other hand, "the length in the thickness direction" of the plate-like particles means the length of the shortest portion in a direction which is orthogonal to the length of the long diameter. It is to be noted that "the length of the long diameter of the plate-like particles" may be referred to simply as "the long diameter of the plate-like particles", and "the length of the plate-like particles in the thickness direction" will be referred to simply as "the thickness of the plate-like particles" sometimes.

(1-1) Zeolite Particles:

The zeolite particles become aggregates in a case where the formed zeolite honeycomb article of the present embodiment is fired.

There is not any special restriction on the zeolite particles which are used in the formed zeolite honeycomb article of the present embodiment, and particles made of heretofore known zeolite can be used. There is not any special restriction on the type of zeolite or the like, but as, for example, the zeolite particles, there can be used particles made of at least one type of zeolite selected from the group consisting of ZSM-5 type zeolite, β-type zeolite, Y-type zeolite, mordenite type zeolite, and ferrierite type zeolite. Among these type of zeolite, ZSM-5 type zeolite and β-type zeolite are preferable, because such type of zeolite has satisfactory purification performance and adsorption ability. The zeolite particles may be particles made of one type of zeolite among the above types of zeolite, or a mixture of a plurality of types of zeolite particles.

There is not any special restriction on the size of such zeolite particles, but the average particle diameter is, for example, preferably 40 μm or less, further preferably from 0.1 to 40 μm and especially preferably from 0.7 to 20 μm. If the average particle diameter of the zeolite particles exceeds 40 μm, the strength of the fired zeolite honeycomb article obtained through firing lowers sometimes. Moreover, during extrusion forming, clogging easily occurs, which may deteriorate forming properties. It is to be noted that if the average particle diameter is less than 0.1 μm, heat resistance lowers sometimes.

It is to be noted that the average particle diameter of the zeolite particles can be obtained by measuring the particle diameters of the zeolite particles from an SEM photograph which is used for calculation of a volume ratio of the inorganic binding material described later by use of the image analysis software (e.g., "Image-Pro Plus (trade name)" manufactured by MEDIA CYBERNETICS, Inc.) to obtain a particle size distribution of the zeolite particles. It is to be noted that during the measurement of the particle diameters by the above image analysis software, when the particles are round, the diameters of the particles can be measured as the particle diameters. Moreover, when the particle diameters of the zeolite particles are measured, an average value of the diameters in at least ten fields of view (i.e., corresponding to ten SEM photographs) is obtained.

Moreover, when the average particle diameter of the zeolite particles which are used in a raw material stage (i.e., a manufacturing stage) can be measured, the average particle diameter of the zeolite particles can be measured in this raw material stage. When the average particle diameter of the zeolite particles is obtained by such a method, the average particle diameter can remarkably easily be obtained. "The average particle diameter" of the zeolite particles in the present embodiment is a median diameter (d50) in the particle diameter distribution of solid particles (zeolite particles) constituting zeolite powder. It is to be noted that the average particle diameter is a value measured by a laser diffraction scattering process in conformity to JIS R1629. It is to be noted that the average particle diameter of the zeolite particles can be measured with, for example, a laser diffraction/scattering type particle size distribution measuring device: "LA-920 (trade name)" manufactured by Horiba, Ltd.

Moreover, the formed zeolite honeycomb article of the present embodiment is preferably made of zeolite (zeolite particles) subjected to ion exchange between cations of zeolite and metal ions. Such zeolite subjected to the ion exchange between cations of zeolite and the metal ions has an excellent catalyst function, and a treatment such as removal of nitrogen oxides ($NO_x$) from an exhaust gas can satisfactorily be performed.

Specifically, zeolite particles of at least a part of the plurality of zeolite particles are preferably particles made of zeolite subjected to ion exchange between cations of zeolite and ions of at least one type of metal selected from the group consisting of copper, iron, nickel, zinc, manganese, cobalt, silver, palladium, indium, cerium, gallium, titanium and vanadium. For example, ion exchange between cations of zeolite and the iron ions or copper ions can obtain a satisfactory $NO_x$ gas purification performance, or ion exchange between cations of zeolite and the copper ions or silver ions can develop a satisfactory hydrocarbon adsorption ability.

It is to be noted that there is not any special restriction on an ion exchange amount between cations of zeolite and the metal ions (the $M^+/Al$ ion molar ratio), but the ion exchange amount is preferably from 0.3 to 2.0, further preferably from 0.7 to 1.5 and especially preferably from 0.9 to 1.2. It is to be noted that the ion exchange amount can be measured with, for example, an inductively coupled plasma mass analysis device: "SPQ9000 (trade name)" manufactured by Seiko Instruments, Inc. It is to be noted that the above ion exchange amount is a molar ratio ("$M^+/Al$ ions") of a metal ion valence ($M^+$) with respect to aluminum ions (Al ions) in zeolite. It is to be noted that if the ion exchange amount is small (e.g., less than 0.3), a catalyst performance lowers. On the other hand, if the ion exchange amount is excessively large (e.g., exceeding 2.0), the catalyst performance is saturated, and the effect due to the ion exchange is not easily developed sometimes. It is to be noted that the ion exchange amount can be represented by the ratio (mass %) of the mass of the metal ions with respect to the mass of the zeolite particles subjected to the exchange.

(1-2) Inorganic Binding Material:

The inorganic binding material is a binding material which binds the above-mentioned zeolite particles and the filler constituted of the plate-like particles having the thin-piece-like shape.

As such an inorganic binding material, there can preferably be used, for example, an inorganic binding material including at least one type selected from the group consisting of alumina sol, silica sol, titania sol, zirconia sol, ceria sol, boehmite, montmorillonite, hydrotalcite, basic aluminum chloride, hydraulic alumina, silicon resin, and water glass.

Moreover, the volume ratio of the inorganic binding material with respect to 100 vol % of a fired article obtained by firing the formed zeolite honeycomb article (i.e., the fired zeolite honeycomb article) is preferably from 10 to 50 vol %, further preferably from 10 to 30 vol %, and especially preferably from 15 to 25 vol %. If the volume ratio of the inorganic binding material is less than 10 vol %, the amount of the binding material is excessively small, and it becomes difficult to satisfactorily bind the zeolite particles and the filler. On the other hand, if the volume ratio of the inorganic binding material exceeds 50 vol %, the amount of the inorganic binding material is excessively large, the relative ratio of the zeolite particles lowers, and functionality of zeolite such as a purifying function of purifying an $NO_x$ gas or the like or an adsorbing function of adsorbing hydrocarbons or the like deteriorates.

It is to be noted that the volume (the true volume) "V" of the fired zeolite honeycomb article is a value obtained by equation (2) as follows.

$$V = V_Z + V_{PZ} + V_{B2} \quad (2),$$

V: the volume (the true volume) of the fired zeolite honeycomb article;

$V_Z$: the volume of the zeolite particles;
$V_{PZ}$: the volume of the (fired) filler (the volume of the plate-like particles); and
$V_{B2}$: the volume of the (fired) inorganic binding material.

The volume $V_Z$ of the zeolite particles, the volume $V_{PZ}$ of the (fired) filler and the volume $V_{B2}$ of the (fired) inorganic binding material can be calculated, for example, from a fine structure photograph of a section of the fired zeolite honeycomb article cut along a predetermined portion. More specifically, in a calculation method of the above volume, for example, the fired zeolite honeycomb article is first cut, and a cut section of the structure is polished. Next, the polished cut section is photographed with a scanning type electron microscope or the like. It is to be noted that when the fine structure of the section is photographed, a field of view preferably includes 10 to 30 zeolite particles.

As to the obtained scanning type electron microscope photograph (hereinafter referred to as "the SEM photograph" sometimes), image analysis software (e.g., "Image-Pro Plus (trade name)" manufactured by MEDIA CYBERNETICS Inc.) is used, and the zeolite particles, the filler and the inorganic binding material are classified to measure particle diameters or an occupied area of the zeolite particles, the occupied area of the filler, and the occupied area of the inorganic binding material. During this measurement, an average value in at least ten fields of view (i.e., corresponding to ten SEM photographs) is obtained.

Furthermore, from the measured values, the volume $V_Z$ of the zeolite particles, the volume $V_{PZ}$ of the (fired) filler and the volume $V_{B2}$ of the (fired) inorganic binding material are calculated. Therefore, in the present description, "the volume of the zeolite particles" means the total value of the volumes of the respective zeolite particles, i.e., the volume which does not include the gaps (voids) among the zeolite particles.

Moreover, when the mass of the zeolite particles, the mass of the filler and the mass of the inorganic binding material to be used in a raw material stage (i.e., a manufacturing stage) are beforehand known, or when the volume of each raw material component can be measured in the manufacturing stage, the volume ratio of the inorganic binding material may be calculated in the raw material stage. When the volume ratio of the inorganic binding material is obtained by such a method, the volume ratio of the inorganic binding material can remarkably easily be obtained. Hereinafter, a method of calculating the volume ratio of the inorganic binding material in the raw material stage will be described.

"$V_Z$: the volume of the zeolite particles" in the above equation (2) can be obtained by equation (3) as follows.

$$V_Z = M_Z/D_Z \quad (3),$$

$V_Z$: the volume of the zeolite particles;
$M_Z$: the mass of the zeolite particles; and
$D_Z$: the density of zeolite (1.85 g/cm$^3$).

"$V_{PZ}$: the volume of the (fired) filler (the volume of the plate-like particles)" in the above equation (2) can be obtained by equation (4) as follows. It is to be noted that in the equation (4), "$M_{PZ}$: the mass of the fired filler (the mass of the fired plate-like particles)" is a value obtained by equation (5) as follows. "$D_{PZ}$: the density of the fired filler (the density of the fired plate-like particles)" in the equation (4) and "$m_F$: the mass change ratio of the filler before/after fired" in the equation (5) are values beforehand obtained through firing only by use of the filler (the plate-like particles).

$$V_{PZ} = M_{PZ}/D_{PZ} \quad (4),$$

$V_{PZ}$: the volume of the fired filler (the volume of the fired plate-like particles);

$M_{P2}$: the mass of the fired filler (the mass of the fired plate-like particles); and $D_{PZ}$: the density of the fired filler (the density of the fired plate-like particles).

$$M_{P2}=M_{P1}\times m_P \quad (5)$$

$M_{P2}$: the mass of the fired filler (the mass of the fired plate-like particles);

$M_{P1}$: the mass of the filler before fired (the mass of the plate-like particles before fired); and $m_P$: the mass change ratio of the filler before/after fired.

Moreover, "$V_{B2}$: the volume of the (fired) inorganic binding material" in the above equation (2) can be obtained by equation (6) as follows. It is to be noted that in the equation (6), "$M_{B2}$: the mass of the fired inorganic binding material" is a value obtained by equation (7) as follows, and "$D_{B2}$: the density of the fired inorganic binding material" in the equation (6) and "$m_B$: the mass change ratio of the inorganic binding material before/after fired" in the equation (7) are values beforehand obtained through the firing only by use of the inorganic binding material.

$$V_{B2}=M_{B2}/D_{B2} \quad (6),$$

$V_{B2}$: the volume of the fired inorganic binding material;

$M_{B2}$: the mass of the fired inorganic binding material; and $D_{B2}$: the density of the fired inorganic binding material.

$$M_{B2}=M_{B1}\times m_B \quad (7)$$

$M_{B2}$: the mass of the fired inorganic binding material;

$M_{B1}$: the mass of the inorganic binding material before fired; and $m_B$: the mass change ratio of the inorganic binding material before/after fired.

(1-3) Plate-Like Particles (Filler):

The plate-like particles are the filler contained in the zeolite raw material, and have a thin-piece-like shape where a length in a thickness direction is short with respect to a length of a long diameter of the particles. When the filler constituted of the plate-like particles having the thin-piece-like shape is contained, the drying shrinkage in a specific direction is satisfactorily suppressed, whereby generation of dry cracks can be prevented.

The plate-like particles are preferably particles constituted of at least one type of a material selected from the group consisting of talc, mica, boron nitride, boehmite, graphite and glass flakes. When such particles are used, the drying shrinkage in the specific direction can satisfactorily be suppressed.

The plate-like particles may be thin-piece-like particles formed by grinding a layered mineral of boehmite or talc described above, or particles such as glass flakes artificially formed in the thin-piece-like shape.

In such plate-like particles, the value (the long diameter/the thickness) of the ratio of the length of the long diameter with respect to the length of the particles in the thickness direction thereof is preferably 10 or more, and the average particle diameter of the plate-like particles is preferably from 20 to 300 µm. It is to be noted that if the value (hereinafter referred to as "the aspect ratio of the plate-like particles" sometimes) of the ratio of the length of the long diameter with respect to the length in the thickness direction is less than 10, the orientation of the plate-like particles worsens, and it may become difficult to perform the anisotropic control of the drying shrinkage. That is, a difference between the drying shrinkage of the partition walls in the thickness direction X and the drying shrinkage of the partition walls in the cell extending direction Z and the diametric direction Y becomes small, and it may become difficult to achieve both the prevention of the generation of the cracks and the improvement of the strength of the fired article. Moreover, if the average particle diameter of the plate-like particles is less than 20 µm, the plate-like particles are excessively small, the orientation of the plate-like particles during the extrusion forming worsens, the anisotropic control of the drying shrinkage is not performed, and an effect of preventing the dry cracks lowers sometimes. If the average particle diameter exceeds 300 µm, during the extrusion forming, a forming die is clogged with the particles sometimes, and formability lowers sometimes.

It is to be noted that the aspect ratio of the plate-like particles can be measured with a scanning type electron microscope. Specifically, the aspect ratio can be obtained by measuring the length of the long diameter of the plate-like particles (the length of the portion having the longest diameter) and the length in the thickness direction (the length of the shortest portion in the direction which is orthogonal to the length of the long diameter) and dividing the measured "length of the long diameter" by "the length in the thickness direction" to calculate a value. It is to be noted that this aspect ratio of the plate-like particles is calculated by measuring the aspect ratios of ten or more randomly selected plate-like particles and obtaining an average value of the measured aspect ratios.

The average particle diameter of the plate-like particles is a median diameter (d50) in a particle diameter distribution of powder containing the plate-like particles. It is to be noted that the average particle diameter is a value measured by a laser diffraction scattering process in conformity to JIS R1629. It is to be noted that the average particle diameter of the plate-like particles can be measured with a laser diffraction/scattering type particle size distribution measuring device: "LA-920 (trade name)" manufactured by Horiba, Ltd.

It is to be noted that the value of the ratio of the length of the long diameter with respect to the length of the plate-like particles in the thickness direction is further preferably from 40 to 150, and especially preferably from 60 to 100. According to such a constitution, the drying shrinkage of the partition walls in the cell extending direction Z and the diametric direction Y can satisfactorily be suppressed. Moreover, in the thickness direction X of the partition walls, the suppression of the drying shrinkage is less performed, and the porosity of the partition walls is lowered, whereby it is possible to improve the mechanical strength of the fired article obtained through the firing.

Moreover, the average particle diameter of the plate-like particles is further preferably from 30 to 150 µm, and especially preferably from 50 to 100 µm. When the plate-like particles having such an average particle diameter are used, the extrusion forming can satisfactorily be performed. Moreover, the generation of the cracks during the drying can more satisfactorily be prevented.

Furthermore, there is not any special restriction on the volume ratio of the plate-like particles, but the plate-like particles are contained preferably from 2.5 to 15 vol %, further preferably from 3 to 10 vol %, and especially preferably from 4 to 7 vol % with respect to 100 vol % of the total of the zeolite particles, the inorganic binding material and the plate-like particles in terms of a solid content. If the volume ratio of the plate-like particles is less than 2.5 vol %, the amount of the plate-like particles is excessively small, and it may become difficult to perform the anisotropic control of the drying shrinkage. On the other hand, if the volume ratio exceeds 15 vol %, the relative ratio of the zeolite particles lowers. Functionality of zeolite such as a purifying function of purifying an $NO_x$ gas or the like or an adsorbing function of adsorbing hydrocarbons or the like deteriorates sometimes.

It is to be noted that the above "in terms of the solid content" means a residual content excluding a component which is present as a liquid at ordinary temperature (20° C.). That is, "the volumes, in terms of the solid content," of the zeolite particles, the inorganic binding material and the plate-like particles can be calculated by "the masses, in terms of the solid content," thereof and "the densities of the solid contents" thereof. The above "mass in terms of the solid content" is the mass corresponding to the solid content of the inorganic binding material included in a solution, when the inorganic binding material is a solution such as an aqueous solution. The mass in terms of the solid content is the mass of the dried article (the solid content) in a case where the article is dried at 120° C. in the atmospheric air for 24 hours.

(1-4) Zeolite Raw Material:

The zeolite raw material (also referred to as the zeolite material) is a forming raw material for obtaining the formed zeolite honeycomb article of the present embodiment, and contains the zeolite raw material, the inorganic binding material and the plate-like particles as the filler as described above.

It is to be noted that the zeolite raw material preferably contains water. The content ratio of water in the zeolite raw material is preferably from 30 to 70 mass % with respect to 100 mass % of the zeolite particles.

Moreover, the zeolite raw material may further contain an organic binder, a dispersant and the like. Examples of the organic binder include hydroxypropyl methylcellulose, methylcellulose, hydroxyethyl cellulose, hydroxyethyl methylcellulose, carboxyl methylcellulose, and polyvinyl alcohol. Moreover, examples of the dispersant include fatty acid, acrylic acid, sorbitan acid, dextrin and polyalcohol.

(1-5) Constitution of Formed Zeolite Honeycomb Article:

The formed zeolite honeycomb article of the present embodiment is a formed article obtained by extruding the zeolite raw material containing at least the zeolite particles, the inorganic binding material and the plate-like particles which are the filler as described above, in the honeycomb shape including the partition walls disposed to form a plurality of cells which become through channels of a fluid and extend from one end face to the other end face.

The plate-like particles in the zeolite raw material is extruded during the extrusion forming so that the longitudinal direction of the plate-like particles (the direction of the long diameter) is parallel to the extruding direction (the cell extending direction of the partition walls) or the extending direction of the partition walls (i.e., the diametric direction of the sections of the partition walls in the honeycomb shape), whereby the drying shrinkage of the partition walls in the thickness direction X becomes larger than the drying shrinkage of the partition walls in the cell extending direction Z and the drying shrinkage of the partition walls in the diametric direction Y of the sections of the partition walls in the honeycomb shape. Moreover, the drying shrinkage of the partition walls in the thickness direction X is 1.2 or more times the drying shrinkage of the partition walls in the diametric direction Y of the sections of the partition walls in the honeycomb shape.

When such a formed zeolite honeycomb article is fired, the structure having the honeycomb shape (the fired zeolite honeycomb article) can be formed, whereby it is possible to obtain a honeycomb structure which is made of zeolite and which purifies an exhaust gas discharged from an engine for a car, an engine for a construction machine, an industrial stationary engine, a burning apparatus or the like and containing $NO_x$ or the like, or adsorbs hydrocarbons or the like contained in the exhaust gas. That is, it is not necessary to use a ceramic carrier of cordierite or the like, which has heretofore been used, and a pressure loss can remarkably be decreased as compared with a case where the ceramic carrier is used.

There is not any special restriction on the shape of a formed zeolite honeycomb article 100 shown in FIG. 1, but an area of a section which is orthogonal to the extending direction of the cells 2 is preferably from 300 to 200000 $mm^2$. If the area is smaller than 300 $mm^2$, an area where the exhaust gas can be treated becomes small sometimes. Additionally, the pressure loss increases. If the area is larger than 200000 $mm^2$, the strength of the fired zeolite honeycomb article lowers sometimes.

Furthermore, as shown in FIG. 1, the formed zeolite honeycomb article 100 of the present embodiment preferably comprises an outer peripheral wall 4 disposed to surround the whole outer periphery of the partition walls 1. The material of the outer peripheral wall does not necessarily have to be the same as the material of the partition walls. However, if the material of an outer peripheral portion is noticeably different in the viewpoints of physical properties such as heat resistance and thermal expansion coefficient, a problem of breakdown of the partition walls or the like occurs sometimes. Therefore, the outer peripheral wall and the partition walls mainly preferably include the same material or contain a material having the equivalent physical properties. The outer peripheral wall may be formed integrally with the partition walls by extrusion, or the outer peripheral portion of a formed article may be processed in a desirable shape and coated with the outer peripheral wall. That is, the outer peripheral wall may be disposed later on the fired zeolite honeycomb article obtained by firing the formed zeolite honeycomb article.

There is not any special restriction on the shape of each cell (i.e., the shape of the section of the cell which is orthogonal to the cell extending direction) in the formed zeolite honeycomb article, and examples of the shape include a triangular shape, a quadrangular shape, a hexagonal shape, an octagonal shape, and a combination of these shapes. Especially in the formed zeolite honeycomb article of the present embodiment, the quadrangular shape is preferable.

The thicknesses of the partition walls in the formed zeolite honeycomb article are preferably from 50 μm to 2 mm, and further preferably from 100 μm to 1 mm. If the thicknesses are smaller than 50 μm, the strength of the fired zeolite honeycomb article lowers sometimes. If the thicknesses are larger than 2 mm, the pressure loss during flowing of a gas through the fired zeolite honeycomb article increases sometimes. It is to be noted that the thicknesses of the partition walls shrink as much as about 2 to 20% by drying. Therefore, as to the thicknesses of the partition walls of the formed zeolite honeycomb article, the thicknesses of the partition walls necessary for the fired zeolite honeycomb article obtained through the drying and further firing and the drying shrinkage are taken into consideration, whereby preferable thicknesses can appropriately be determined.

Moreover, there is not any special restriction on the cell density of the formed zeolite honeycomb article, but the cell density is preferably from 7.8 to 155.0 $cells/cm^2$, and further preferably from 31.0 to 93.0 $cells/cm^2$. If the cell density is larger than 155.0 $cells/cm^2$, the pressure loss during the flowing of the gas through the fired zeolite honeycomb article increases sometimes. If the cell density is smaller than 7.8 $cells/cm^2$, the area to perform an exhaust gas purification treatment becomes small sometimes.

There is not any special restriction on the whole shape of the formed zeolite honeycomb article, and examples of the shape include a cylindrical shape, an oval shape and another desirable shape. In particular, after firing the formed zeolite honeycomb article, it is possible to grind and process the outer periphery of the fired article. Therefore, the shape may be an indefinite shape other than the above shapes. Moreover, as to the size of the formed zeolite honeycomb article, when the article has, for example, a cylindrical shape, the diameter of the bottom surface of the article is preferably from 20 to 500 mm, and further preferably from 70 to 300 mm. Moreover, the length of the formed zeolite honeycomb article in the cell extending direction (i.e., the extruding direction) is preferably from 10 to 500 mm, and further preferably from 30 to 300 mm.

The drying shrinkage of the partition walls in the thickness direction thereof is preferably from 10 to 50%, further preferably from 12 to 20%, and especially preferably from 13 to 16%. If the drying shrinkage of the partition walls in the thickness direction is less than 10%, the mechanical strength of the fired zeolite honeycomb article lowers sometimes. On the other hand, if the maximum value of the drying shrinkage is substantially 50% and the zeolite raw material having, for example, a drying shrinkage exceeding 50% is used, the amount of water to be added to the raw material becomes remarkably large. During the extrusion forming, the shape retention properties of the zeolite raw material deteriorate (in other words, the zeolite raw material becomes excessively soft), whereby it becomes difficult to hold the honeycomb shape. A satisfactory formed zeolite honeycomb article cannot be obtained sometimes.

Moreover, the drying shrinkage of the partition walls in the cell extending direction thereof is preferably 10.5% or less, further preferably from 1 to 10%, and especially preferably from 1 to 8%. If the drying shrinkage of the partition walls in the cell extending direction exceeds 10.5%, the drying shrinkage becomes large, and cracks are easily generated during drying. It is to be noted that the drying shrinkage of the partition walls in the cell extending direction is preferably small, but the lower limit value of the drying shrinkage which can be realized is 1% as described above.

Furthermore, the drying shrinkage of the partition walls in the diametric direction of the sections of the partition walls in the honeycomb shape is preferably 10.5% or less, further preferably from 1 to 10%, and especially preferably from 1 to 8%. If the drying shrinkage of the partition walls in the diametric direction of the sections of the partition walls in the honeycomb shape exceeds 10.5%, the drying shrinkage becomes large, and cracks are easily generated during drying. It is to be noted that the drying shrinkage of the partition walls in the diametric direction of the sections of the partition walls in the honeycomb shape is preferably small, but the lower limit value of the drying shrinkage which can be realized is 1% as described above.

In addition, the drying shrinkage of the partition walls in the thickness direction thereof is 1.2 or more times the drying shrinkage of the partition walls in the diametric direction of the sections of the partition walls in the honeycomb shape, but the drying shrinkage is preferably from 1.2 to 50 times, further preferably from 1.5 to 7 times, and especially preferably from 2 to 4.5 times. It is to be noted that if the drying shrinkage of the partition walls in the thickness direction exceeds 50 times the drying shrinkage in the diametric direction, the drying shrinkage of the partition walls in the thickness direction becomes relatively excessively large sometimes.

(2) Manufacturing Method of Formed Zeolite Honeycomb Structure:

Next, a manufacturing method of the formed zeolite honeycomb article of the present invention will be described.

Examples of the manufacturing method of the formed zeolite honeycomb article of the present embodiment include a manufacturing method comprising a step of mixing zeolite particles, an inorganic binding material, a filler constituted of plate-like particles having a thin-piece-like shape where a length in a thickness direction is small with respect to a length of a long diameter of the particles, and an organic binder to prepare a zeolite raw material (hereinafter referred to as "the zeolite raw material preparation step" sometimes); and a step of extruding the obtained zeolite raw material to obtain a formed zeolite article (hereinafter referred to as "the extrusion forming step" sometimes).

(2-1) Zeolite Raw Material Preparation Step:

First, the zeolite particles, the filler constituted of the plate-like particles having the thin-piece-like shape where the length in the thickness direction is small with respect to the length of the long diameter and the inorganic binding material which binds the zeolite particles and the filler constituted of the plate-like particles, to prepare the zeolite raw material. In this case, as the plate-like particles, there are preferably used the plate-like particles in which the value (the long diameter/the thickness) of the ratio of the length of the long diameter with respect to the length in the thickness direction is 10 or more and the average particle diameter is from 20 to 200 μm. As such plate-like particles, there can preferably be used the preferable example of the plate-like particles in the formed zeolite honeycomb article of the present embodiment, i.e., the plate-like particles having a preferable aspect ratio and a preferable average particle diameter. When such plate-like particles are used, the anisotropic control of the drying shrinkage can satisfactorily be performed.

Moreover, as to the plate-like particles, the average particle diameter of the zeolite particles is preferably 40 μm or less, further preferably from 0.1 to 40 μm, and especially preferably from 0.7 to 20 μm. If the average particle diameter of the zeolite particles exceeds 40 μm, the strength of the fired zeolite honeycomb article obtained through firing lowers, or clogging occurs during the extrusion forming, whereby a satisfactory formed article cannot be obtained sometimes. Moreover, the plate-like particles are preferably added from 2.5 to 15 vol %, further preferably from 3 to 10 vol %, and especially preferably from 4 to 7 vol % with respect to 100 vol % of the total of the zeolite particles, the inorganic binding material and the plate-like particles in terms of the solid content. In the above range, the drying shrinkage of the partition walls can satisfactorily be controlled.

It is to be noted that the anisotropy of the drying shrinkage can be controlled in accordance with the above aspect ratio and average particle diameter of the plate-like particles and the amount of the plate-like particles to be added. When the shape (the aspect ratio and the average particle diameter) of the plate-like particles and the amount of the particles to be added are regulated, the partition walls having a desirable drying shrinkage (in other words, the formed zeolite honeycomb article) can be obtained by the extrusion forming. That is, in the formed zeolite honeycomb article of the present embodiment, the drying shrinkage of the partition walls in the thickness direction is larger than the drying shrinkage of the partition walls in the cell extending direction and the drying shrinkage of the partition walls in the diametric direction of the sections of the partition walls in the honeycomb shape. Moreover, the drying shrinkage of the partition walls in the thickness direction needs to be 1.2 or more times the drying shrinkage of the partition walls in the diametric direction of the sections of the partition walls in the honeycomb shape. Therefore, for the purpose of satisfying these conditions, the above aspect ratio and average particle diameter of the plate-like particles and the amount of the plate-like particles to be added are preferably regulated.

Moreover, the control (the anisotropic control) of the drying shrinkage by the plate-like particles is considered to be influenced by the average particle diameter of the zeolite particles to be used. For example, when the average particle diameter of the zeolite particles is excessively large as compared with the average particle diameter of the plate-like particles (e.g., when the average particle diameter of the zeolite particles is ½ or more time the average particle diameter of the plate-like particles), the orientation properties of the plate-like particles deteriorate. The plate-like particles are added to decrease the effect of the anisotropic control, a difference between the drying shrinkages in the respective directions becomes small, and it becomes difficult to set the drying shrinkage of the partition walls in the thickness direction to be 1.2 or more times the drying shrinkage of the partition walls in the diametric direction of the sections of the partition walls in the honeycomb shape. In such a case, there occurs a problem that the strength of the fired zeolite honeycomb article obtained through firing lowers, or cracks are generated during the drying.

In consequence, when the zeolite raw material is prepared, as the zeolite particles, there can especially preferably be used particles having an average particle diameter of 40 µm or less and plate-like particles having an aspect ratio of 10 or more and an average particle diameter of 20 to 300 µm.

It is to be noted that as the zeolite particles and the inorganic binding material, there can preferably be used the zeolite particles and inorganic binding material of the formed zeolite honeycomb article of the present embodiment as described above. Moreover, when the zeolite raw material is prepared, water is preferably added as a dispersion medium, and a dispersant and the like may further be added.

Moreover, the zeolite particles may be subjected to an ion exchange treatment between the particles and metal ions. When such zeolite particles are used, it is possible to easily manufacture a fired zeolite honeycomb article having an excellent catalyst function. It is to be noted that when zeolite is subjected to the ion exchange, for example, the fired zeolite honeycomb article obtained by firing the formed zeolite honeycomb article can be subjected to the ion exchange treatment.

It is to be noted that examples of a method of subjecting the zeolite particles or the fired zeolite honeycomb article to the ion exchange treatment between cations of zeolite and the metal ions include a method as follows.

A solution for ion exchange containing metal ions for the ion exchange (the solution containing the metal ions) is prepared. For example, when the ion exchange is performed by using silver ions, an aqueous solution of silver nitrate or silver acetate is prepared. Moreover, when the ion exchange is performed by using copper ions, an aqueous solution of copper acetate, copper sulfate or copper nitrate is prepared. Furthermore, when the ion exchange is performed by using iron ions, an aqueous solution of iron sulfate or iron acetate is prepared. The concentration of the solution for ion exchange is preferably from 0.005 to 0.5 (mol/liter). Moreover, the zeolite particles are immersed in the solution for ion exchange. Immersion time can appropriately be determined in accordance with the amount of the metal ions for the ion exchange or the like. Furthermore, when the zeolite particles are taken out of the solution for ion exchange, dried and calcinated, the zeolite particles subjected to the ion exchange can be obtained. Drying conditions are preferably from 80 to 150° C. and from one to ten hours. Calcinating conditions are preferably from 400 to 600° C. and from one to ten hours.

There is not any special restriction on a method of mixing the zeolite particles, the inorganic binding material and the plate-like particles, and a known method can be employed. Examples of the method include a method of mixing the materials in a dry system (i.e., without adding any water) for 10 to 30 minutes by use of a twin arm type kneader manufactured by Honda Machinery Works Co., Ltd., and then, mixing and kneading the material for 20 to 60 minutes while further adding water to the mixed material to regulate viscosity of the material.

(2-2) Extrusion Forming Step:

Next, the obtained zeolite raw material is extruded in a honeycomb shape, to obtain a formed zeolite article. During the extrusion forming, there is preferably used a die having a desirable whole shape, cell shape, partition wall thickness, cell density and the like. As a material of the die, a metal which does not wear easily is preferable. Moreover, when the formed zeolite honeycomb article is formed in a honeycomb shape, for example, first the zeolite raw material is preferably kneaded to obtain a columnar formed article, and the columnar formed article is extrusion-formed as a formed zeolite article having the honeycomb shape. There is not any special restriction on a method of kneading the forming raw material to obtain the columnar formed article, and examples of the method include methods using a kneader, a vacuum clay kneader and the like.

Figure 3:
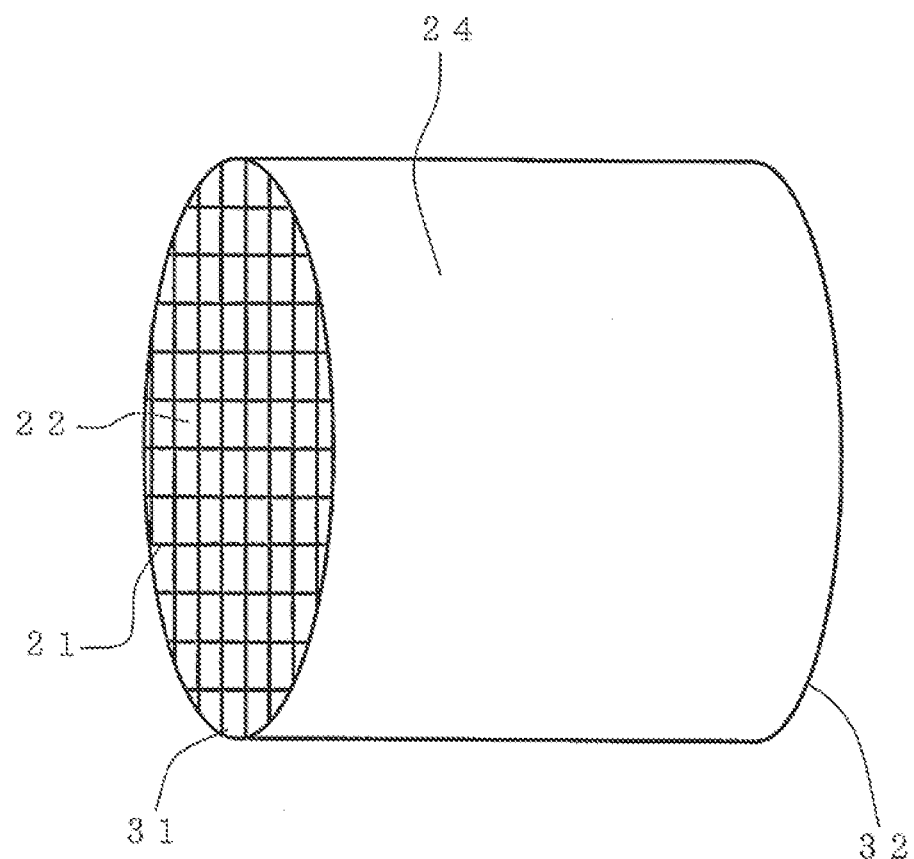
FIG. 3 is a perspective view schematically showing one embodiment of a fired zeolite honeycomb article of the present invention.

(3) Fired Zeolite Honeycomb Article:

Next, an embodiment of the fired zeolite honeycomb article of the present invention will specifically be described. As shown in FIG. 3, the embodiment of the fired zeolite honeycomb article of the present invention is a fired zeolite honeycomb article 200 obtained by firing the formed zeolite honeycomb article of the present embodiment described above, and the article comprises partition walls 21 disposed to form a plurality of cells 22 which become through channels of a fluid and extend from one end face 31 to the other end face 32. Here, FIG. 3 is a perspective view schematically showing one embodiment of the fired zeolite honeycomb article of the present invention.

The fired zeolite honeycomb article of the present embodiment is a fired article obtained by binding, with the inorganic binding material, the zeolite particles which are used as aggregates and the plate-like particles which are used as the filler. The fired article can be used in an adsorbing material, a catalyst, a catalyst carrier, a gas separation membrane or an ion exchanger. The fired article can preferably be used especially to remove $NO_x$ or the like contained in the exhaust gas discharged from the engine for the car, the engine for the construction machine, the industrial stationary engine, the burning apparatus or the like.

Especially, in the fired zeolite honeycomb article of the present embodiment, the anisotropic control of the drying shrinkage is performed in the formed zeolite honeycomb article before fired. Therefore, in the drying step before the firing, the cracks are not easily generated, and in the thickness direction of the partition walls, the formed article appropriately shrinks, whereby the partition walls also have an excellent mechanical strength.

The fired zeolite honeycomb article of the present embodiment is preferably, for example, a porous article obtained by binding the zeolite particle and the plate-like particles with the inorganic binding material.

It is to be noted that the porosity and pore diameters (fine pore diameters) of the fired zeolite honeycomb article of the present embodiment need to be considered from two viewpoints. In the first viewpoint, zeolite (the zeolite particles) is a substance having fine pores as a crystal structure. Therefore, the first viewpoint relates to fine pores having a value inherent in the type of zeolite. The value is determined, when the type of zeolite is determined. For example, ZSM-5 type zeolite has fine pores of oxygen ten-membered rings, and fine pore diameters are from about 0.5 to 0.6 nm. Moreover, β-type zeolite has fine pores of oxygen twelve-membered rings, and fine pore diameters are from about 0.5 to 0.75 nm. In the second viewpoint, the fired zeolite honeycomb article includes the zeolite particles (zeolite crystal particles) integrated with the binding material, and hence the second viewpoint relates to the porosity and pore diameters of the fired zeolite honeycomb article (the porous article).

In the fired zeolite honeycomb article of the present embodiment, the porosity is preferably from 20 to 60%, further preferably from 30 to 50%, and especially preferably from 30 to 40%. If the porosity is excessively low, purification performance lowers sometimes. On the other hand, if the porosity is excessively high, strength lowers sometimes. It is to be noted that the porosity is a value calculated in the following equation (8) by use of a pore capacity per unit mass of pores having pore diameters of 3 nm to 180 μm measured by mercury porosimetry, and true density of the fired zeolite honeycomb article.

$$\text{Porosity} = \text{pore capacity}/(\text{pore capacity} + 1/\text{true density of fired zeolite honeycomb article}) \times 100 \quad (8)$$

It is to be noted that in the above equation (8), the pore capacity was a value measured with a fully automatic multi-functional mercury porosimeter "PoreMaster 60GT (trade name)" manufactured by Quantachrome Instruments. Moreover, as to the true density of the fired zeolite honeycomb article, the density of zeolite (the zeolite particles) was set to 1.85 g/cm$^3$. Moreover, the true density of the plate-like particles (the filler) is a value set in accordance with a material of the particles. Furthermore, the true density of the inorganic binding material was a value measured with a dry type automatic densimeter "Accupyc 1330 (trade name)" manufactured by Micromeritics Instruments Co.

It is to be noted that the whole shape of the fired zeolite honeycomb article of the present embodiment, the area in the section of the article, the cell shape and cell density, the partition wall thicknesses and the like are appropriately determined in accordance with the constitution of the formed zeolite honeycomb article before fired. That is, a preferable configuration of the fired zeolite honeycomb article is also determined in accordance with a preferable configuration of the formed zeolite honeycomb article described above.

As shown in FIG. 3, the fired zeolite honeycomb article of the present embodiment preferably comprises an outer peripheral wall 24 disposed to surround the whole outer periphery of the partition walls 21. The outer peripheral wall may be formed integrally with the partition walls by extrusion forming, or the outer peripheral portion of a formed article may be processed in a desirable shape and coated with the outer peripheral wall. The outer peripheral wall 24 preferably has a thickness of 10 mm or less. If the thickness is larger than 10 mm, an area to perform an exhaust gas purification treatment becomes small sometimes.

(4) Manufacturing Method of Fired Zeolite Honeycomb Article:

Next, a manufacturing method of the fired zeolite honeycomb article of the present invention will be described.

When the fired zeolite honeycomb article of the present embodiment is manufactured, first the formed zeolite honeycomb article is prepared in accordance with a manufacturing method of the formed zeolite honeycomb article described above. Afterward, the obtained formed zeolite honeycomb article is fired, whereby the fired zeolite honeycomb article of the present embodiment can be manufactured. Therefore, "the formed and fired zeolite honeycomb article" is "the fired zeolite honeycomb article".

It is to be noted that before the firing, the formed zeolite honeycomb article is preferably dried. There is not any special restriction on a drying method, and examples of the method include electromagnetic heating systems such as microwave heating drying and high frequency inductive heating drying, and external heating systems such as hot air drying and superheated water vapor drying. Among these methods, there is a method of drying the article to remove a predetermined amount of water by the electromagnetic heating system and then drying the article to remove the remaining water by the external heating system, and this method is preferable in that the whole formed article can quickly and uniformly be dried so as to prevent cracks from being generated.

Moreover, before firing (finally firing) the formed zeolite honeycomb article, the formed zeolite honeycomb article is preferably calcinated. The article is calcinated to degrease the article. There is not any special restriction on this method, as long as contained organic substances (the organic binder, the dispersant, etc.) can be removed. As calcinating conditions, the article is preferably heated at about 200 to 500° C. in an oxidizing atmosphere for about one to 20 hours.

There is not any special restriction on a method of firing the formed zeolite honeycomb article, and the article can be fired by using an electric furnace, a gas furnace or the like. As firing conditions, the article is preferably heated at a temperature from 500 to 850° C. in the atmosphere for one to ten hours.

Moreover, when the zeolite particles subjected to the ion exchange treatment are not used as the zeolite particles contained in the zeolite raw material of the formed zeolite honeycomb article, the formed and fired zeolite honeycomb article may be subjected to the ion exchange treatment between cations of zeolite and the metal ions.

EXAMPLES

Hereinafter, the present invention will further specifically be described with respect to examples, but the present invention is not limited to these examples.

Example 1

As zeolite particles, there was prepared powder of zeolite particles made of β-type zeolite, subjected to 3 mass % ion exchange between cations of zeolite and copper ions and having an average particle diameter of 0.7 μm (hereinafter, the zeolite particles will be referred to as "the zeolite particles (1)").

Moreover, as inorganic binding materials, there were prepared boehmite having a specific surface area of 130 m$^2$/g, and montmorillonite. Moreover, as the plate-like particles of the filler, there was prepared mica in which a value of a ratio of a length of a long diameter with respect to a length in a thickness direction (the aspect ratio) was 85 and an average particle diameter was 52 μm (hereinafter, this mica will be referred to as "mica (1)").

To 3500 g of zeolite particles including the above β-type zeolite particles, as the inorganic binding materials, 1400 g of boehmite and 100 g of montmorillonite were added as described above. Furthermore, as plate-like particles of a filler, 250 g of mica (1) was added.

Furthermore, as an organic binder, 210 g of hydroxypropyl methylcellulose (HPMC) was added. The materials were mixed in a dry system for ten minutes by use of a twin arm type kneader manufactured by Honda Machinery Works Co., Ltd. While further adding water to regulate viscosity, the material was mixed and kneaded for 40 minutes, to obtain a kneaded substance of zeolite (a zeolite raw material). Table 1 indicates physical properties of the zeolite particles, Table 2 indicates physical properties of a plate-like member, and Table 3 indicates a blending prescription of the zeolite raw material. It is to be noted that in Table 1, column "crystal system" means the type of zeolite constituting the zeolite particles (the crystal system). In Table 2, column "aspect ratio" means "the value of the ratio of the length of the long diameter with respect to the length of the plate-like particles in the thickness direction".

The obtained mixed and kneaded zeolite substance was extruded with a continuous kneading vacuum extrusion forming machine manufactured by Honda Machinery Works Co., Ltd., to extrusion-form a columnar formed article. The obtained formed article was further extruded in a honeycomb shape with a plunger type extrusion forming machine to prepare a formed zeolite honeycomb article. It is to be noted that in the formed zeolite honeycomb article, an end face had a diameter of 40 mm, partition walls had a thickness of 0.3 mm, and a cell density was 46.5 cells/cm$^2$.

Moreover, the obtained formed zeolite honeycomb article was dried with a microwave drier and a hot air drier, to obtain a dried zeolite honeycomb article. Furthermore, the obtained dried zeolite honeycomb article was degreased at 450° C. in a firing furnace for five hours, and fired at 700° C. for four hours, to obtain the fired zeolite honeycomb article.

It is to be noted that an average particle diameter of zeolite particles or plate-like particles is a median diameter (d50) in a particle diameter distribution of powder containing the respective particles. The diameter was measured by a laser diffraction scattering process in conformity to JIS R1629.

Moreover, the specific surface area which was BET specific surface area was measured by using a flow type specific surface area measuring device: "FlowSorb-2300 (trade name)" manufactured by Micromeritics Instruments Co. after a sample pretreatment where a sample was held at 200° C. for ten minutes. Here, the specific surface area is the surface area per unit mass indicating a value acquired by obtaining a molecule number (N) necessary for covering the surface of the sample with a monomolecular layer of a gas adsorbed in the surface of the sample, for example, by gas physical adsorption with B.E.T principle, multiplying this adsorption molecular number (N) by a molecule sectional area of the adsorbed gas to obtain the surface area of the sample, and dividing the surface area of this sample by the mass of the sample.

Furthermore, a value (the aspect ratio) of a ratio of a length of a long diameter with respect to a length of the plate-like particles in a thickness direction was obtained by measuring the lengths of the long diameters of the ten or more plate-like particles and the lengths thereof in the thickness direction with a scanning type electron microscope, dividing the measured "length of the long diameter" by "the length in the thickness direction", and calculating an average value of the values.

Moreover, a drying shrinkage of the obtained formed zeolite honeycomb article was measured by a method as follows. Furthermore, there was calculated a value of a ratio of the drying shrinkage of the partition walls in the thickness direction thereof with respect to the drying shrinkage of the partition walls in a diametric direction of sections of the partition walls in the honeycomb shape. In addition, the presence/absence of dry cracks during drying of the formed zeolite honeycomb article was evaluated, and a compressive strength of the fired zeolite honeycomb article was measured by a method as follows. Table 4 indicates the results of the compressive strength, the value of the ratio of the drying shrinkage with respect to the drying shrinkage and the presence/absence of the dry cracks. It is to be noted that in Table 4, column "the drying shrinkage in the thickness direction/the drying shrinkage in the diametric direction" means "the value of the ratio of the drying shrinkage of the partition walls in the thickness direction with respect to the drying shrinkage of the partition walls in the diametric direction of the sections of the partition walls in the honeycomb shape".

(Drying Shrinkage)

As to the obtained formed zeolite honeycomb article and the dried zeolite honeycomb article obtained by drying this formed zeolite honeycomb article, the thicknesses of the partition walls disposed to form cells were measured with an optical microscope. Then, outer diameters and lengths in a cell extending direction of the formed zeolite honeycomb article and the dried zeolite honeycomb article were measured with a caliper. The drying shrinkages (%) in the respective directions were calculated from the measured lengths by the above equation (1). The measurement results are shown in Table 4.

(Compressive Strength (MPa))

The obtained fired zeolite honeycomb article was processed in a columnar shape having an outer diameter of 25 mm and a height of 25 mm, and the fired and processed zeolite honeycomb article was compressed in the cell extending direction, and a pressure (MPa) during occurrence of breakdown was measured as a compressive strength (MPa). It is to be noted that "the breakdown occurs" means that when a compression test is performed to compress the fired zeolite honeycomb article processed as described above, a load rapidly decreases with respect to displacement due to the compression. That is, when the above compression test is performed to prepare a graph (a load-displacement curve) in which the abscissa indicates displacement due to compression and the ordinate indicates the load, the load increases with the increase of the displacement due to the compression before the breakdown occurs. On the other hand, when the breakdown occurs, there is confirmed a present situation where the displacement increases, but the load contrarily decreases. It is judged by an inflection point of this graph that the breakdown has occurred. It is to be noted that the compressive strength (MPa) is calculated from the load (the load at the inflection point) by equation (9) as follows:

$$\text{Compressive strength} = \text{breakdown load}/5.07 \times 0.098 \quad (9)$$

(Presence/Absence of Dry Crack)

As to the dried zeolite honeycomb article obtained by drying the formed zeolite honeycomb article, the presence/absence of cracks due to drying was determined from visual external observation. When cracks were confirmed, "present" was indicated. When any crack was not confirmed, "none" was indicated.

TABLE 1

| Zeolite particles | Average particle diameter (d50) | Crystal system |
|---|---|---|
| Zeolite (1) | 0.7 μm | β-type |
| Zeolite (2) | 14 μm | ZSM-5 type |
| Zeolite (3) | 43 μm | ZSM-5 type |

TABLE 2

| Filler (plate-like particles) | Average particle diameter (d50) | Aspect ratio |
|---|---|---|
| Mica (1) | 52 μm | 85 |
| Mica (2) | 22 μm | 70 |
| Glass flake (1) | 162 μm | 16 |
| Glass flake (2) | 25 μm | 3 |
| Fine-particle plate-like boehmite | 5 μm | 45 |

TABLE 3

| | Example 1 | Example 2 | Example 3 | Example 4 | Example 5 |
|---|---|---|---|---|---|
| Zeolite (1) | 3500 g | 3500 g | 3500 g | — | 3500 g |
| Zeolite (2) | — | — | — | 3500 g | — |
| Mica (1) | 250 g | — | — | 250 g | 180 g |
| Mica (2) | — | — | 250 g | — | — |
| Glass flake (1) | — | 250 g | — | — | — |
| Boehmite | 1400 g | 1400 g | 1400 g | 1400 g | 1400 g |
| Montmorillonite | 100 g | 100 g | 100 g | 100 g | 100 g |
| HPMC | 210 g | 210 g | 210 g | 210 g | 210 g |

TABLE 4

| | | Example 1 | Example 2 | Example 3 | Example 4 | Example 5 |
|---|---|---|---|---|---|---|
| Compressive strength (MPa) | | 4.8 | 4.1 | 4.6 | 4.4 | 4.7 |
| Drying shrinkage | Cell extending direction | 9.8% | 7.0% | 9.7% | 8.8% | 10.2% |
| | Diametric direction | 10.2% | 6.3% | 10.3% | 9.2% | 10.1% |
| | Thickness direction | 15.0% | 15.8% | 13.0% | 13.6% | 13.9% |
| Drying shrinkage in thickness direction/drying shrinkage in diametric direction | | 1.47 | 2.51 | 1.26 | 1.48 | 1.38 |
| Presence/absence of dry cracks | | None | None | None | None | None |
| Ratio of average particle diameter of plate-like particles with respect to that of zeolite particles | | 74 | 231 | 31 | 3.7 | 74 |
| Volume ratio (vol %) of plate-like particles | | 3.4 | 3.8 | 3.2 | 3.4 | 2.5 |
| Volume ratio (vol %) of inorganic binding material with respect to 100 vol % of fired zeolite honeycomb article | | 17.6 | 17.6 | 17.7 | 17.6 | 17.8 |

Example 2

A formed zeolite honeycomb article was prepared, dried and fired to manufacture a fired zeolite honeycomb article in the same manner as in Example 1 except that as shown in Table 2 and Table 3, as plate-like particles of a filler, 250 g of glass flakes having an aspect ratio of 16 and an average particle diameter of 162 μm were used (hereinafter, the glass flakes will be referred to as "glass flakes (1)"). In the same manner as in Example 1, there were measured a compressive strength of the fired article, a value of a ratio between a drying shrinkage of the formed article in a thickness direction and a drying shrinkage thereof in a diametric direction, and presence/absence of dry cracks. The results are shown in Table 4.

Example 3

A formed zeolite honeycomb article was prepared, dried and fired to manufacture a fired zeolite honeycomb article in the same manner as in Example 1 except that as shown in Table 2 and Table 3, as plate-like particles of a filler, 250 g of mica having an aspect ratio of 70 and an average particle diameter of 22 μm was used (hereinafter, the mica will be referred to as "mica (3)"). In the same manner as in Example 1, there were measured a compressive strength of the fired article, a value of a ratio between a drying shrinkage of the formed article in a thickness direction and a drying shrinkage thereof in a diametric direction, and presence/absence of dry cracks. The results are shown in Table 4.

Example 4

A formed zeolite honeycomb article was prepared, dried and fired to manufacture a fired zeolite honeycomb article in the same manner as in Example 1 except that as shown in Table 1 and Table 3, as zeolite particles, 3500 g of powder of zeolite particles made of ZSM-5 type zeolite, subjected to 3 mass % ion exchange between cations of zeolite and copper ions and having an average particle diameter of 14 μm was used (hereinafter, the zeolite particles will be referred to as "zeolite particles (2))". In the same manner as in Example 1, there were measured a compressive strength of the fired article, a value of a ratio between a drying shrinkage of the formed article in a thickness direction and a drying shrinkage thereof in a diametric direction, and presence/absence of dry cracks. The results are shown in Table 4. Moreover, Table 4 indicates "the ratio of the average particle diameter of the plate-like particles with respect to the average particle diameter of the zeolite particles", "the volume ratio of the plate-like particles with respect to 100 vol % of the total of the zeolite particles, the inorganic binding material and the plate-like particles in terms of a solid content (Table 4 indicates "the volume ratio of the plate-like particles (vol %)")" and "the volume ratio (vol %) of the inorganic binding material with respect to 100 vol % of the fired zeolite honeycomb article".

Example 5

A formed zeolite honeycomb article was prepared, dried and fired to manufacture a fired zeolite honeycomb article in the same manner as in Example 1 except that as shown in Table 3, as plate-like particles of a filler, 180 g of mica (1) was used. In the same manner as in Example 1, there were measured a compressive strength of the fired article, a value of a ratio between a drying shrinkage of the formed article in a thickness direction and a drying shrinkage thereof in a diametric direction, and presence/absence of dry cracks. The results are shown in Table 4.

Comparative Example 1

A formed zeolite honeycomb article was prepared, dried and fired to manufacture a fired zeolite honeycomb article in the same manner as in Example 1 except that as shown in Table 5, plate-like particles of a filler were not used. In the same manner as in Example 1, there were measured a compressive strength of the fired article, a value of a ratio between a drying shrinkage of the formed article in a thickness direction and a drying shrinkage thereof in a diametric direction, and presence/absence of dry cracks. The results are shown in Table 6.

Comparative Example 2

A formed zeolite honeycomb article was prepared, dried and fired to manufacture a fired zeolite honeycomb article in the same manner as in Example 1 except that as shown in Table 2 and Table 5, as a filler, 250 g of glass flakes having an aspect ratio of 3 and an average particle diameter of 25 μm were used (hereinafter, the glass flakes will be referred to as "glass flakes (2)"). In the same manner as in Example 1, there were measured a compressive strength of the fired article, a value of a ratio between a drying shrinkage of the formed article in a thickness direction and a drying shrinkage thereof in a diametric direction, and presence/absence of dry cracks. The results are shown in Table 6.

Comparative Example 3

A formed zeolite honeycomb article was prepared, dried and fired to manufacture a fired zeolite honeycomb article in the same manner as in Example 1 except that as shown in Table 2 and Table 5, as a filler, 250 g of fine-particle plate-like boehmite having an aspect ratio of 45 and an average particle diameter of 5 μm was used. In the same manner as in Example 1, there were measured a compressive strength of the fired article, a value of a ratio between a drying shrinkage of the formed article in a thickness direction and a drying shrinkage thereof in a diametric direction, and presence/absence of dry cracks. The results are shown in Table 6.

Comparative Example 4

A formed, zeolite honeycomb article was prepared, dried and fired to manufacture a fired zeolite honeycomb article in the same manner as in Example 1 except that as shown in Table 1 and Table 5, as zeolite particles, 3500 g of zeolite particles (2) were used and as shown in Table 2 and Table 5, as plate-like particles of a filler, 250 g of mica (2) was used. In the same manner as in Example 1, there were measured a compressive strength of the fired article, a value of a ratio between a drying shrinkage of the formed article in a thickness direction and a drying shrinkage thereof in a diametric direction, and presence/absence of dry cracks. The results are shown in Table 6.

Comparative Example 5

A formed zeolite honeycomb article was prepared, dried and fired to manufacture a fired zeolite honeycomb article in the same manner as in Example 1 except that as shown in Table 1 and Table 5, as zeolite particles, 3500 g of powder of zeolite particles made of ZSM-5 type zeolite, subjected to 3 mass % ion exchange between cations of zeolite and copper ions and having an average particle diameter of 43 μm was used (hereinafter, the zeolite particles will be referred to as "zeolite particles (3))". In the same manner as in Example 1, there were measured a compressive strength of the fired article, a value of a ratio between a drying shrinkage of the formed article in a thickness direction and a drying shrinkage thereof in a diametric direction, and presence/absence of dry cracks. The results are shown in Table 6.

Comparative Example 6

A formed zeolite honeycomb article was prepared, dried and fired to manufacture a fired zeolite honeycomb article in the same manner as in Example 1 except that as shown in Table 5, as plate-like particles of a filler, 70 g of mica (1) was used. In the same manner as in Example 1, there were measured a compressive strength of the fired article, a value of a ratio between a drying shrinkage of the formed article in a thickness direction and a drying shrinkage thereof in a diametric direction, and presence/absence of dry cracks. The results are shown in Table 6.

Comparative Example 7

A formed zeolite honeycomb article was prepared, dried and fired to manufacture a fired zeolite honeycomb article in the same manner as in Example 1 except that as shown in Table 5, as an inorganic binding material, 600 g of boehmite was used. In the same manner as in Example 1, there were measured a compressive strength of the fired article, a value of a ratio between a drying shrinkage of the formed article in a thickness direction and a drying shrinkage thereof in a diametric direction, and presence/absence of dry cracks. The results are shown in Table 6.

TABLE 5

|  | Com. Ex. 1 | Comp. Ex. 2 | Comp. Ex. 3 | Comp. Ex. 4 | Comp. Ex. 5 | Comp. Ex. 6 | Comp. Ex. 7 |
|---|---|---|---|---|---|---|---|
| Zeolite (1) | 3500 g | 3500 g | 3500 g | — | — | 3500 g | 3500 g |
| Zeolite (2) | — | — | — | 3500 g | — | — | — |
| Zeolite (3) | — | — | — | — | 3500 g | — | — |
| Mica (1) | — | — | — | — | 250 g | 70 g | 250 g |
| Mica (2) | — | — | — | 250 g | — | — | — |
| Glass flake (2) | — | 250 g | — | — | — | — | — |
| Fine-particle plate-like boehmite | — | — | 250 g | — | — | — | — |
| Boehmite | 1400 g | 1400 g | 1400 g | 1400 g | 1400 g | 1400 g | 600 g |
| Montmorillonite | 100 g | 100 g | 100 g | 100 g | 100 g | 100 g | 100 g |
| HPMC | 210 g | 210 g | 210 g | 210 g | 210 g | 210 g | 210 g |

TABLE 6

|  |  | Comp. Ex. 1 | Comp. Ex. 2 | Comp. Ex. 3 | Comp. Ex. 4 | Comp. Ex. 5 | Comp. Ex. 6 | Comp. Ex. 7 |
|---|---|---|---|---|---|---|---|---|
| Compressive strength (MPa) | | 5.9 | 3.4 | 4.5 | 4.4 | 1.2 | 4.9 | 1.1 |
| Drying shrinkage | Cell extending direction | 14.5% | 8.3% | 11.2% | 10.6% | 2.4% | 11.5% | 1.7% |
| | Diametric direction | 14.2% | 8.2% | 10.9% | 11.2% | 2.8% | 11.4% | 1.9% |
| | Thickness direction | 14.6% | 8.8% | 10.3% | 12.7% | 2.9% | 13.3% | 2.1% |

TABLE 6-continued

|  | Comp. Ex. 1 | Comp. Ex. 2 | Comp. Ex. 3 | Comp. Ex. 4 | Comp. Ex. 5 | Comp. Ex. 6 | Comp. Ex. 7 |
|---|---|---|---|---|---|---|---|
| Drying shrinkage in thickness direction/drying shrinkage in diametric direction | 1.03 | 1.07 | 0.94 | 1.13 | 1.04 | 1.17 | 1.11 |
| Presence/absence of dry cracks | Present | None | Present | Present | None | Present | None |
| Ratio of average particle diameter of plate-like particles with respect to that of zeolite particles | — | 36 | 7.1 | 1.6 | 1.2 | 74 | 74 |
| Volume ratio (vol %) of plate-like particles | — | 3.7 | 3.6 | 3.2 | 3.4 | 1.0 | 3.9 |
| Volume ratio (vol %) of inorganic binding material with respect to 100 vol % of fired zeolite honeycomb article | 18.3 | 17.6 | 17.8 | 17.7 | 17.6 | 18.1 | 9.4 |

As seen from Table 3 to Table 6, the formed zeolite honeycomb articles of Examples 1 to 5 have a constitution in which the plate-like particles are used as the filler and the drying shrinkage of the partition walls in the thickness direction becomes larger than the drying shrinkage of the partition walls in the cell extending direction and the drying shrinkage of the partition walls in the diametric direction of the sections of the partition walls in the honeycomb shape. Moreover, the drying shrinkage of the partition walls in the thickness direction is 1.2 or more times the drying shrinkage of the partition walls in the diametric direction of the sections of the partition walls in the honeycomb shape. Moreover, in the dried zeolite honeycomb articles obtained by drying the formed zeolite honeycomb articles of Examples 1 to 6, any dry crack was not confirmed. Furthermore, the fired zeolite honeycomb articles obtained through firing had an excellent compressive strength (all the fired articles had a compressive strength of 4 MPa or more).

On the other hand, the formed zeolite honeycomb articles of Comparative Examples 1, 3, 4 and 6 had an excellent compressive strength of the fired article, but "the value of the ratio of the drying shrinkage of the partition walls in the thickness direction with respect to the drying shrinkage of the partition walls in the diametric direction of the sections of the partition walls in the honeycomb shape" was less than 1.2. Therefore, after drying, the generation of the dry cracks was confirmed. In Comparative Example 1, since any plate-like, particle was not used, the anisotropic control of the drying shrinkage was not sufficiently performed. In Comparative Example 3, since the plate-like particles had a remarkably small average particle diameter, and hence the plate-like particles were not oriented, the anisotropic control of the drying shrinkage was not sufficiently performed. In Comparative Example 4, since the average particle diameter of the plate-like particles was less than twice the average particle diameter of the zeolite particles, and hence the plate-like particles were not oriented, the anisotropic control of the drying shrinkage was not sufficiently performed. Further in Comparative Example 6, it was supposed that since the amount of the plate-like particles was remarkably small, the anisotropic control of the drying shrinkage was not sufficiently performed.

Moreover, in Comparative Example 2, the aspect ratio of the glass flakes (2) was a remarkably small value of 3, whereby the drying shrinkage in a specific direction could not be suppressed. The fired article had a low compressive strength. That is, in Comparative Example 2, a difference between the drying shrinkages in the respective directions was small, and "the value of the ratio of the drying shrinkage of the partition walls in the thickness direction with respect to the drying shrinkage of the partition walls in the diametric direction of the sections of the partition walls in the honeycomb shape" was less than 1.2. It is supposed that the partition walls were not sufficiently compressed in the thickness direction, and the strength lowered.

Moreover, it is supposed in Comparative Example 7 that the amount of boehmite as the inorganic binding material to be added was excessively small, and the drying shrinkages in all the directions were small, whereby the strength lowered.

In Comparative Example 5, the average particle diameter of the zeolite particles was excessively large, and an effect of the anisotropic control of the drying shrinkage by the plate-like particles was not easily obtained. "The value of the ratio of the drying shrinkage of the partition walls in the thickness direction with respect to the drying shrinkage of the partition walls in the diametric direction of the sections of the partition walls in the honeycomb shape" was less than 1.2. After the drying, the generation of the cracks was confirmed.

A formed zeolite honeycomb article of the present invention can be used in an adsorbing material, a catalyst, a catalyst carrier, a gas separation membrane or an ion exchanger. In particular, the formed zeolite honeycomb article can preferably be utilized to manufacture a fired zeolite honeycomb article which purifies an exhaust gas discharged from an engine for a car, an engine for a construction machine, an industrial stational engine, a burning apparatus or the like and containing $NO_x$ or the like. Moreover, the fired zeolite honeycomb article of the present invention can be used in the adsorbing material, the catalyst, the catalyst carrier, the gas separation membrane or the ion exchanger.

DESCRIPTION OF REFERENCE NUMERALS

1 and 21: partition wall, 2 and 22: cell, 4 and 24: outer peripheral wall, 11 and 31: one end, 12 and 32: the other end, 100: formed zeolite honeycomb article and 200: fired zeolite honeycomb article.

What is claimed is:

1. A formed zeolite honeycomb article comprising a formed article obtained by extruding a zeolite raw material containing zeolite particles, an inorganic binding material which binds the zeolite particles to one another and a filler constituted of plate-like particles having a thin-piece-like shape where a length in a thickness direction is small as compared with a length of a long diameter, in a honeycomb shape including partition walls disposed to form a plurality of cells which become through channels of a fluid and extend from one end face to the other end face, wherein the partition walls have a constitution where a drying shrinkage of the partition walls in a thickness direction is larger than a drying shrinkage of the partition walls in a cell extending direction and a drying shrinkage of the partition walls in a diametric direction of sections of the partition walls which is perpendicular to the cell extending direction in the honeycomb shape, and the drying shrinkage of the partition walls in the thickness direction is 1.2 or more times the drying shrinkage of the partition walls in the diametric direction of the sections of the partition walls which is perpendicular to the cell extending direction in the honeycomb shape.

2. The formed zeolite honeycomb article according to claim 1, wherein in the plate-like particles constituting the filler, a value (the long diameter/a thickness) of a ratio of the length of the long diameter with respect to the length thereof in the thickness direction is 10 or more, the average particle diameter of the plate-like particles is 20 μm or more and is twice or more the average particle diameter of the zeolite particles, the plate-like particles are contained in an amount corresponding to 2.5 to 15 vol % with respect to 100 vol % of the total of the zeolite particles, the inorganic binding material and the plate-like particles in terms of a solid content, and the inorganic binding material is contained in an amount corresponding to 10 to 50 vol % with respect to 100 vol % of a fired article obtained by firing the formed zeolite honeycomb article.

3. A fired zeolite honeycomb article which is obtained by firing the formed zeolite honeycomb article according to claim 2.

4. The formed zeolite honeycomb article according to claim 2, wherein the plate-like particles are particles constituted of at least one type of a material selected from the group consisting of talc, mica, boron nitride, boehmite, graphite and glass flakes.

5. A fired zeolite honeycomb article which is obtained by firing the formed zeolite honeycomb article according to claim 4.

6. The formed zeolite honeycomb article according to claim 4, wherein the average particle diameter of the zeolite particles is from 0.1 to 40 μm.

7. A fired zeolite honeycomb article which is obtained by firing the formed zeolite honeycomb article according to claim 6.

8. The formed zeolite honeycomb article according to claim 6, wherein zeolite particles of at least a part of the zeolite particles are particles made of at least one type of zeolite selected from the group consisting of ZSM-5 type zeolite, β-type zeolite, Y-type zeolite, mordenite type zeolite and ferrierite type zeolite.

9. A fired zeolite honeycomb article which is obtained by firing the formed zeolite honeycomb article according to claim 8.

10. The formed zeolite honeycomb article according to claim 8, wherein zeolite particles of at least a part of the zeolite particles are particles made of zeolite subjected to ion exchange between cations of zeolite and ions of at least one type of metal selected from the group consisting of copper, iron, nickel, zinc, manganese, cobalt, silver, palladium, indium, cerium, gallium, titanium, and vanadium.

11. A fired zeolite honeycomb article which is obtained by firing the formed zeolite honeycomb article according to claim 10.

12. The formed zeolite honeycomb article according to claim 10, wherein the inorganic binding material includes at least one type selected from the group consisting of alumina sol, silica sol, titania sol, zirconia sol, ceria sol, boehmite, montmorillonite, hydrotalcite, basic aluminum chloride, hydraulic alumina, silicon resin, and water glass.

13. A fired zeolite honeycomb article which is obtained by firing the formed zeolite honeycomb article according to claim 12.

14. The formed zeolite honeycomb article according to claim 1, wherein the plate-like particles are particles constituted of at least one type of a material selected from the group consisting of talc, mica, boron nitride, boehmite, graphite and glass flakes.

15. The formed zeolite honeycomb article according to claim 1, wherein the average particle diameter of the zeolite particles is from 0.1 to 40 μm.

16. The formed zeolite honeycomb article according to claim 1, wherein zeolite particles of at least a part of the zeolite particles are particles made of at least one type of zeolite selected from the group consisting of ZSM-5 type zeolite, β-type zeolite, Y-type zeolite, mordenite type zeolite and ferrierite type zeolite.

17. The formed zeolite honeycomb article according to claim 1, wherein zeolite particles of at least a part of the zeolite particles are particles made of zeolite subjected to ion exchange between cations of zeolite and ions of at least one type of metal selected from the group consisting of copper, iron, nickel, zinc, manganese, cobalt, silver, palladium, indium, cerium, gallium, titanium, and vanadium.

18. The formed zeolite honeycomb article according to claim 1, wherein the inorganic binding material includes at least one type selected from the group consisting of alumina sol, silica sol, titania sol, zirconia sol, ceria sol, boehmite, montmorillonite, hydrotalcite, basic aluminum chloride, hydraulic alumina, silicon resin, and water glass.

19. A fired zeolite honeycomb article which is obtained by firing the formed zeolite honeycomb article according to claim 1.

20. The formed zeolite honeycomb article according to claim 1, wherein the average particle diameter of the plate-like particles is 20 μm or more.

21. The formed zeolite honeycomb article according to claim 1, wherein the plate-like particles have two or more flat surfaces substantially parallel to each other and the length in the thickness direction is smaller than the length of the flat surfaces.

22. A manufacturing method of a formed zeolite honeycomb article, comprising:

a step of mixing zeolite particles, an inorganic binding material which binds the zeolite particles to one another, a filler constituted of plate-like particles having a thin-piece-like shape where a length in a thickness direction is small as compared with a length of a long diameter thereof, and an organic binder to prepare a zeolite raw material; and a step of extruding the obtained zeolite raw material in a honeycomb shape to obtain a formed zeolite article, wherein as the plate-like particles constituting the filler, there are used particles in which a value (the long diameter/a thickness) of a ratio of the length of the long diameter with respect to the length thereof in the thickness direction is 10 or more, the average particle diameter of the plate-like particles is 20 μm or more and is twice or more the average particle diameter of the zeolite particles, and in the zeolite raw material, the plate-like particles are contained in an amount corresponding to 2.5 to 15 vol % with respect to 100 vol % of the total of the zeolite particles, the inorganic binding material and the plate-like particles in terms of a solid content, and the inorganic binding material is contained in an amount corresponding to 10 to 50 vol % with respect to 100 vol % of a fired article obtained by firing the formed zeolite honeycomb article, wherein the partition walls have a constitution where a drying shrinkage of the partition walls in a thickness direction is larger than a drying shrinkage of the partition walls in a cell extending direction and of the partition walls in a diametric direction of sections of the partition walls which is perpendicular to the cell extending direction in the honeycomb shape, and the drying shrinkage of the partition walls in the thickness direction is 1.2 or more times the drying shrinkage of the partition walls in the diametric direction of the sections of the partition walls which is perpendicular to the cell extending direction in the honeycomb shape.

* * * * *